Reissued Aug. 15, 1950

Re. 23,254

UNITED STATES PATENT OFFICE 23,254

MANUFACTURE OF ISOBUTYLENE

William C. Offutt, Oakmont, Pa., assignor to Gulf Research & Development Company, Pittsburgh, Pa., a corporation of Delaware No Drawing. Original No. 2,498,999, dated February 28, 1950, Serial No. 750,641, May 26, 1947. Application for reissue June 8, 1950, Serial No. 166,969

2 Claims. (Cl. 260—683)

Matter enclosed in heavy brackets [ ] appears in the original patent but forms no part of this reissue specification; matter printed in italics indicates the additions made by reissue

This invention relates to the manufacture of isobutylene, and more particularly to the depolymerization of isobutylene polymers to yield isobutylene.

In the production of high molecular weight polymers from isobutylene, it is essential to employ substantially pure isobutylene as a starting material, as otherwise it is difficult if not impossible to secure the desired high molecular weight polymers. In the production of tertiary butyl phenols by alkylation of the phenols with isobutylene, it is also desirable to employ substantially pure isobutylene. Since the isobutylene available in the petroleum industry, for example from refinery gases and gases obtained by dehydrogenating butane is usually contaminated with normal butylene and butane, it is necessary to separate the isobutylene. One such method comprises the selective polymerization of isobutylene predominantly to dimer. This is done by passing the mixed gases containing isobutylene and normal butylenes thru 60 to 70% sulfuric acid at room temperature, whereby the isobutylene is selectively absorbed. Upon heating the sulfuric acid containing the isobutylene to a temperature around 100° C., the isobutylene polymerizes predominantly to the dimer, with smaller amounts of codimers, and trimers. This polymer mixture is then subjected to thermal decomposition at elevated temperatures, preferably in the presence of a natural clay catalyst such as fuller's earth, bentonite, or the like.

A serious defect of the process heretofore described has been the short active life of the catalysts. The rapid deactivation of such catalysts with the consequent need for frequent replacement has rendered this process unduly difficult and costly.

This invention has as an object, therefore, a process for the depolymerization of liquid isobutylene polymers wherein the catalyst possesses a long active life.

A further object of this invention is to provide a catalyst for the depolymerization of isobutylene dimers which is capable of giving high yields of virtually pure isobutylene. Other objects will appear hereinafter.

These objects are accomplished by the present invention wherein a liquid isobutylene polymer to be depolymerized is passed at an elevated temperature over a catalyst comprising a synthetic surface active silica-alumina having a low cracking activity index.

As stated, the synthetic silica-alumina catalysts employed in accordance with my invention have a low cracking activity index, that is, the cracking activity of my catalysts for the conversion of hydrocarbon oils into gasoline is so low as to be uneconomical for that purpose. However, when in this condition, the catalysts are admirably suited for the depolymerization of isobutylene polymers, particularly isobutylene dimer, being superior to catalysts heretofore employed in regard to active life, mechanical durability, catalytic activity and the capacity for repeated regeneration to remove carbonaceous deposits. Thus, I have found that a catalyst of the type described in Example 1 of U. S. Patent 2,283,173 to J. R. Bates, of May 19, 1942, is an excellent catalyst for the depolymerization of isobutylene dimers after it has been employed in the cracking of gas oil to gasoline for such a time as to have lost substantially all of its cracking activity for this purpose. It should be understood that the loss of cracking activity mentioned hereinabove does not refer to the decrease of cracking activity resulting from the deposition of carbonaceous materials on the catalyst, but refers to the condition of the catalyst after repeated conversion cycles, including regeneration to burn off carbonaceous deposits.

Other synthetic surface active silica-alumina catalysts may also be employed, it being immaterial how the catalyst is made provided it is a synthetic surface active silica-alumina catalyst and has a low cracking activity index. Although the use of catalyst discarded from the catalytic cracking of hydrocarbon oils is an advantageous feature of my invention, other methods may be employed to reduce the activity of the catalyst. Thus the cracking activity of the catalysts may be reduced to the desired point by subjecting the catalyst to a steam treatment. A suitable method for reducing the activity of the catalysts by treating with steam comprises exposing the catalyst at a temperature of 1300° F. for a period of four hours to steam at atmospheric pressure.

The desired low[er] cracking activity of the catalyst may be determined quantitatively by measuring the cracking activity index of the catalyst. By cracking activity index, I refer to the volume per cent of 400° F. end-point gasoline obtained by cracking a standard East Texas gas oil under standardized conditions which comprise a temperature of 800° F., a liquid hourly space velocity of 1.5, and a ten minute cycle in the presence of 200 cc. of the particular catalyst being studied. The East Texas gas oil employed has the following inspection:

| | |
|---|---|
| Specific gravity $\frac{60° F.}{60° F.}$ | 0.8423 |
| Gravity, °API | 36.5 |
| Sulfur, percent | 0.137 |
| Aniline point, °C | 73.4 |

A. S. T. M. DISTILLATION

| | °F. |
|---|---|
| Initial boiling point | 430 |
| 10% | 480 |
| 50% | 531 |
| 90% | 636 |
| End point | 692 |

The preferred cracking activity index of the synthetic surface active silica-alumina catalysts of my invention is about 28 to 30, however cracking activity indices of 22 to 32 may also be employed.

According to a preferred embodiment of my invention, an isobutylene polymer, for example, one containing about 55% diisobutylene, 15% codimer, 5% light material, and the remainder as trimer plus traces of higher polymers is pumped to a preheater where the polymer is heated to a temperature of about 450° F. The polymer, after passing through the preheater, enters a reactor preferably of the cylindrical type. The reactor is maintained at a temperature in the range 450° to 750° F., preferably 600° to 675° F., and a pressure which is substantially atmospheric or slightly higher. The reactor is filled with a low cracking activity synthetic silica-alumina catalyst, such as described hereinabove. The particle size of the catalyst is about 4–6 mesh. However, the size of the catalyst is not critical, but the larger size avoids excessive pressure drop through the reactor. The liquid hourly space velocity through the reactor is of the order of 0.5 to 1.0, and is preferably about 0.8. After passing through the reactor, the material passes to a fractionating column from which pure isobutylene is separated overhead. After an extended period carbonaceous material is deposited on the catalyst to such an extent as to reduce the depolymerizing activity. It is a feature of this invention that repeated burn-offs of such carbonaceous deposits with an oxygen containing gas, such as air, to regenerate the catalyst are not harmful to the life or activity of the catalysts for depolymerization of the isobutylene polymers.

The following results were obtained using the isobutylene polymer and catalyst heretofore described. At 675° F. and a space velocity of 0.333, the catalyst after being continuously utilized for a period of 72 hours had lost less than 3 per cent of its initial activity; whereas under the same conditions an attapulgus clay catalyst had lost 15 per cent of its initial activity after only 35 hours of use. In addition, conversion of the polymer into isobutylene with the catalyst of my invention was 87 per cent by weight or greater, while with attapulgus clay it varied from 41.6 to 80.6 per cent.

From the foregoing, it may readily be seen that the depolymerization of isobutylene dimers in the presence of synthetic surface active silica-alumina catalysts having a low cracking activity index results in high yields of virtually pure isobutylene, with negligible deposition of carbonaceous materials on the catalyst. However, when the removal of carbonaceous deposits becomes necessary or desirable, burning off may be accomplished repeatedly without destroying the activity or shortening the life of the catalysts. Furthermore, the catalysts have a long active life and are mechanically stable, thus obviating the necessity for the *frequent* [frequency] catalyst replacement characteristic of prior art catalysts.

What I claim is:

1. A process for depolymerizing a liquid polymer comprising essentially isobutylene dimer which comprises passing said polymer at a temperature of from 450° to 750° F. over a catalyst comprising a synthetic surface active silica-alumina having a cracking activity index of from 22 to 32, said cracking activity index being the volume per cent of 400° F. end-point gasoline obtained by cracking an East Texas gas oil at a temperature of 800° F., a liquid hourly space velocity of 1.5 and a ten minute cycle in the presence of 200 cc. of said catalyst, the East Texas gas oil having a gravity of 36.5° API and an A. S. T. M. distillation as follows:

| | °F. |
|---|---|
| Initial boiling point | 430 |
| 10% | [400] *480* |
| 50% | 531 |
| 90% | 636 |
| End point | 692 |

2. A process for depolymerizing a liquid polymer comprising essetially isobutylene dimer which comprises passing said polymer at a temperature of from 600° to 675° F. and at a liquid hourly space velocity of about 0.8 over a catalyst comprising a synthetic surface active silica-alumina having a cracking activity index of 28 to 30, and recovering the isobutylene formed thereby, said cracking activity index being the volume per cent of 400° F. end-point gasoline obtained by cracking an East Texas gas oil at a temperature of 800° F., a liquid hourly space velocity of 1.5 and a ten minute cycle in the presence of 200 cc. of said catalyst, the East Texas gas oil having a gravity of 36.5 °API and an A. S. T. M. distillation as follows:

| | °F. |
|---|---|
| Initial boiling point | 430 |
| 10% | [400] *480* |
| 50% | 531 |
| 90% | 636 |
| End point | 692 |

WILLIAM C. OFFUTT.

REFERENCES CITED

The following references are of record in the file of this or the original patent:

UNITED STATES PATENTS

| Number | Name | Date |
|---|---|---|
| 2,065,474 | Cunradi et al. | Dec. 22, 1936 |
| 2,178,808 | Rosen et al. | Nov. 7, 1939 |
| 2,196,363 | Robertson | Apr. 9, 1940 |
| 2,282,499 | Smeykal | May 12, 1942 |
| 2,314,457 | Rotheli et al. | Mar. 23, 1943 |
| 2,347,231 | Stowener et al. | Apr. 25, 1944 |
| 2,390,951 | Leum et al. | Dec. 11, 1945 |
| 2,415,454 | Whitaker | Feb. 11, 1947 |

FOREIGN PATENTS

| Number | Country | Date |
|---|---|---|
| 518,558 | Great Britain | Feb. 29, 1940 |